(12) United States Patent
Eisele et al.

(10) Patent No.: US 8,891,068 B2
(45) Date of Patent: Nov. 18, 2014

(54) OPTICAL DISTANCE MEASURING DEVICE WITH CALIBRATION DEVICE

(75) Inventors: Andreas Eisele, Leinfelden-Echterdingen (DE); Oliver Wolst, Singapore (SG); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 13/498,553

(22) PCT Filed: Sep. 20, 2010

(86) PCT No.: PCT/EP2010/063774
§ 371 (c)(1),
(2), (4) Date: Jun. 4, 2012

(87) PCT Pub. No.: WO2011/042290
PCT Pub. Date: Apr. 14, 2011

(65) Prior Publication Data
US 2012/0236290 A1 Sep. 20, 2012

(30) Foreign Application Priority Data

Oct. 5, 2009 (DE) .......................... 10 2009 045 323

(51) Int. Cl.
| | |
|---|---|
| G01C 25/00 | (2006.01) |
| G01C 5/00 | (2006.01) |
| G01C 15/00 | (2006.01) |
| G01S 17/32 | (2006.01) |
| G01S 7/497 | (2006.01) |

(52) U.S. Cl.
CPC .............. *G01C 15/002* (2013.01); *G01C 25/00* (2013.01); *G01S 17/32* (2013.01); *G01S 7/497* (2013.01)
USPC ..................................... 356/6; 356/3; 702/97

(58) Field of Classification Search
USPC .......................................... 356/3–22; 702/97
See application file for complete search history.

(56) References Cited

U.S. PATENT DOCUMENTS

| | | | | |
|---|---|---|---|---|
| 6,463,393 | B1 * | 10/2002 | Giger | 702/97 |
| 7,417,718 | B2 | 8/2008 | Wada et al. | |
| 7,486,386 | B1 * | 2/2009 | Holcombe et al. | 356/4.01 |
| 8,368,876 | B1 * | 2/2013 | Johnson et al. | 356/5.01 |
| 2007/0182949 | A1 * | 8/2007 | Niclass | 356/3 |

FOREIGN PATENT DOCUMENTS

| | | |
|---|---|---|
| CN | 1954187 A | 4/2007 |
| CN | 101581783 A | 11/2009 |
| DE | 196 43 287 A1 | 4/1998 |

OTHER PUBLICATIONS

International Search Report corresponding to PCT Application No. PCT/EP2010/063774, mailed Dec. 20, 2010 (German and English language document) (5 pages).

* cited by examiner

*Primary Examiner* — Kara E Geisel
*Assistant Examiner* — Dominic J Bologna
(74) *Attorney, Agent, or Firm* — Maginot, Moore & Beck LLP

(57) ABSTRACT

A measuring apparatus for optically measuring a distance to a target object is described. The measuring apparatus has a transmitting device for emitting periodically modulated optical measuring radiation towards the target object, a receiving device for detecting optical measuring radiation which returns from the target object, and an evaluation device for receiving and evaluating detection signals from the receiving device. The measuring apparatus also has a calibration device for calibrating the measuring apparatus, wherein the calibration device is designed to calibrate the measuring apparatus on the basis of detection of uncorrelated radiation which does not correlate with the modulated measuring radiation emitted by the transmitting device. In this case, the uncorrelated radiation may be in the form of background radiation. Alternatively, uncorrelated measuring radiation can be emitted by the transmitting device and can be detected by the receiving device.

14 Claims, 2 Drawing Sheets

OPTICAL DISTANCE MEASURING DEVICE WITH CALIBRATION DEVICE

This application is a 35 U.S.C. §371 National Stage Application of PCT/EP2010/063774, filed on Sep. 20, 2010, which claims the benefit of priority to Serial No. DE 10 2009 045 323.7, filed on Oct. 5, 2009 in Germany, the disclosures of which are incorporated herein by reference in their entirety.

BACKGROUND

The disclosure relates to a measuring device for measuring a distance between the measuring device and a target object with the aid of optical radiation. Such a measuring device is also designated as an optical distance measuring device and can be provided as a separate, for example handheld, device or in another device, for example a tool. In particular, the disclosure relates to an optical distance measuring device equipped with a calibration unit in order to be able to increase a measurement accuracy of the distance measuring device by calibrating an actual distance measurement.

Optical distance measuring devices are known which align a temporally modulated light beam in the direction toward a target object whose distance from the measuring device is intended to be determined. Returning light reflected or scattered back from the target object aimed at is at least partly detected by the measuring device and used for determining the distance to be measured. In this case, a typical measurement range is for distances from a few centimeters up to several hundred meters.

US 2007/0182949 A1 discloses a distance measuring device comprising a light source for illuminating the target object using continuously modulated light, a solid-state image sensor comprising an array of avalanche photodiodes, and a plurality of circuits for processing signals that have been output by the avalanche photodiodes, in order to provide data which are dependent on the light reflected from the target object onto the photodiodes. The circuits have a multiplexer designed to accumulate signals output by the avalanche photodiodes during different subperiods in different storage devices.

The avalanche photodiodes serving as photon counters in this case receive the light reflected back from the target object and also background radiation additionally present and generate at their output electrical pulses in each case, wherein the temporal pulse density correlates with the impinging light power. The read-out of the pulses from the avalanche photodiodes is effected with the aid of a multiplexer arrangement. The latter can be operated synchronously with a modulation of a laser used as light source in such a way that the pulses of the avalanche photodiodes increment different digital counters in a manner dependent on the point in time of the respective detection events, that is to say for example of a photon absorbed in the avalanche photodiode. A temporal period with which the light source illuminates the target object in a modulated fashion is in this case subdivided into a plurality of subperiods. A number of digital counters corresponding to the number of subperiods are provided, wherein, during each subperiod, a correspondingly assigned digital counter is in each case incremented in accordance with the detection pulses received during the subperiod. In this way, detection events can be accumulated over a measurement time. While an individual period can have, for example, time durations in the range of nanoseconds, the total measurement time can comprise many such periods and last, for example, several milliseconds or several seconds. By accumulating the measurement results in the digital counters, it is possible to record a type of histogram of the detection events relative to the temporal occurrence of detection events within subperiods. As soon as a modulation impressed on the modulated light emitted by the light source is present in the counter readings of the digital counters with sufficient statistical accuracy, it is possible, by means of a phase evaluation, to deduce a propagation time of the light between emission and detection and hence a distance between the distance measuring device and the target object. Such a principle of laser distance measurement is generally known by the designation "time of flight ranging" for example with continuous or pulsed modulation of the intensity of the laser beam.

An evaluation unit which operates in this way and which, within a distance measuring device, receives detection signals from a light-sensitive detector and evaluates them by registering the detection signals in a manner synchronized with a reference, that is to say accumulating them in accordance with their temporal occurrence relative to the periodicity of the modulated measurement light used, is also designated as so-called "binning architecture". Such a binning architecture can be realized for example with a delay locked delay line (DLL).

It has been observed that distance measuring devices which operate for example in the manner described above on the basis of photon counters, multiplexer arrangements and binning architectures cannot always yield satisfactory measurement accuracies.

SUMMARY

There may therefore be a need for a distance measuring device in which a measurement accuracy, and in particular a reliability of a measurement accuracy, is improved.

Such a need can be fulfilled with a measuring device as described herein. Further configurations of the measuring device are specified in the dependent claims.

Aspects of the measuring device proposed can be regarded as being based on the following insights and concepts:

As a possible source of measurement errors or measurement inaccuracies in the above-described distance measuring device, for example, it has been recognized that a measurement result can be influenced greatly by temporal lengths of the subperiods into which the total period of the modulated measurement light is subdivided and during which detection signals are accumulated by incrementing an assigned counter. Different lengths of the subperiods can, particularly if the differences in length are randomly established and are not known, act as system-dictated error sources and bring about systematic errors when determining a distance to be measured. Such systematical errors should be differentiated, in principle, from noise-dictated errors, since they cannot be reduced by longer measurement times, but rather regularly only with the aid of a more accurate calibration of the distance measuring device.

Therefore, a distance measuring device is proposed which additionally comprises a calibration unit, with the aid of which the measuring device can be calibrated in an advantageous manner.

In this case, the proposed measuring device for optical distance measurement comprises a transmitting unit for emitting periodically modulated optical measurement radiation toward a target object, a receiving unit for detecting optical measurement radiation returning from the target object, and an evaluation unit for receiving and evaluating detection signals of the receiving unit.

Moreover, the measuring device comprises a calibration unit for calibrating the measuring device, which is designed to calibrate the measuring device, and in particular the evaluation unit of the measuring device, on the basis of a detection of uncorrelated radiation which does not correlate with the modulated measurement radiation emitted by the transmitting unit.

A fundamental concept in this case is to be able to carry out a calibration of the measuring device, in particular the evaluation unit of the measuring device, before, in the course of or after an actual distance measurement. In contrast to the actual distance measurement, in which a distance can be determined with the aid of periodically modulated measurement radiation on the basis of a phase shift between emitted and detected measurement radiation and a time of flight of the measurement radiation that can be calculated therefrom, the calibration is intended to be effected with uncorrelated, preferably unmodulated radiation. In this case, the term "uncorrelated" is intended to express the fact that the radiation used for the calibration is preferably temporally unmodulated with regard to a property detected by the receiving unit, such as, for example, an intensity of the radiation, or is at least not modulated with a modulation which correlates with the periodically operating evaluation unit. In other words, by way of example, the uncorrelated radiation is intended to be able to be regarded as substantially temporally constant within a period duration with which the transmitting unit periodically modulates the measurement radiation during a normal distance measurement. Alternatively, the uncorrelated radiation can be generated as radiation modulated at high frequency, under the condition that this does not run synchronously with the "binning" of the evaluation unit, and, if appropriate, is integrated over many periods.

The unmodulated radiation used can be for example background radiation, for example in the form of normal ambient light. Such background radiation is by definition uncorrelated and in distance measurements usually always impinges on the receiving unit anyway and generates there a substantially constant background signal. While this background signal is regularly ignored during the distance measurement and can even make a distance measurement more difficult, it is now possible to use the background signal in the context of a calibration process on account of its temporally constant properties.

Alternatively, the transmitting unit of the measuring device itself can be designed for emitting uncorrelated, preferably unmodulated measurement radiation. In other words, the transmitting unit can be designed, on the one hand, to emit measurement radiation in a periodically modulated manner during an actual distance measurement and, on the other hand, to turn off the modulation in a targeted manner during a calibration process, in order to emit measurement radiation in an unmodulated manner. By detecting such unmodulated measurement radiation, it is then possible to effect a desired calibration. By virtue of the fact that, in addition to background radiation possibly present, unmodulated radiation from the transmitting unit is also detected by the receiving unit, a measurement signal detected by the receiving unit can be increased and a calibration process can thus be accelerated.

In this case, the measurement radiation used for the calibration process need not necessarily leave the measuring device toward the outside, as would be the case during the actual distance measurement. Instead, the measurement radiation can be guided within the measuring device directly onto the detector. A measurement signal independent of background radiation can thereby be generated, for example, at the detector.

The measuring device can be designed to the effect that unmodulated radiation impinges on the receiving unit with an intensity adapted to a detection sensitivity of the receiving unit. By way of example, the receiving unit can have a paralyzable radiation detector such as, for example, an SPAD (single photon avalanche diode) which, given a specific impinging radiation intensity, has a maximum of a detection event rate as detector signal. Advantageously, in this case the unmodulated radiation is directed onto the receiving unit in such a way that its intensity is adapted to the maximum of the detector signal. If measurement radiation from the transmitting unit is used as uncorrelated radiation, its intensity can be set in a targeted manner by the corresponding driving of the transmitting unit. Alternatively, corresponding optical elements such as, for example, absorption elements in the form of diaphragms or filters can also be integrated into a beam path of the radiation impinging on the receiving unit, in order to be able to adapt the intensity of the radiation to be detected in a targeted manner.

The measuring device can furthermore be designed to determine a duration of a calibration process to be performed by the calibration unit on the basis of a predefined calibration accuracy and an intensity of the unmodulated radiation detected by the receiving unit. In this case, the calibration accuracy can, for example, be preset in a device-specific manner or be predefined by a user via an associated input device before the calibration is carried out. The higher the desired calibration accuracy and the lower the intensity of the detected unmodulated radiation, the longer the duration of the calibration process should be chosen.

Possible aspects, advantages and configurations of the disclosure have been described above with reference to individual embodiments of the disclosure. The description, the associated figures and the claims contain numerous features in combination. A person skilled in the art will also consider these features, in particular also the features of different exemplary embodiments, individually and combine them to form expedient further combinations.

BRIEF DESCRIPTION OF THE DRAWINGS

Embodiments of the disclosure and partial aspects contained therein are described below with reference to the accompanying figures. The figures are merely schematical and not true to scale.

DETAILED DESCRIPTION

Figure 1:
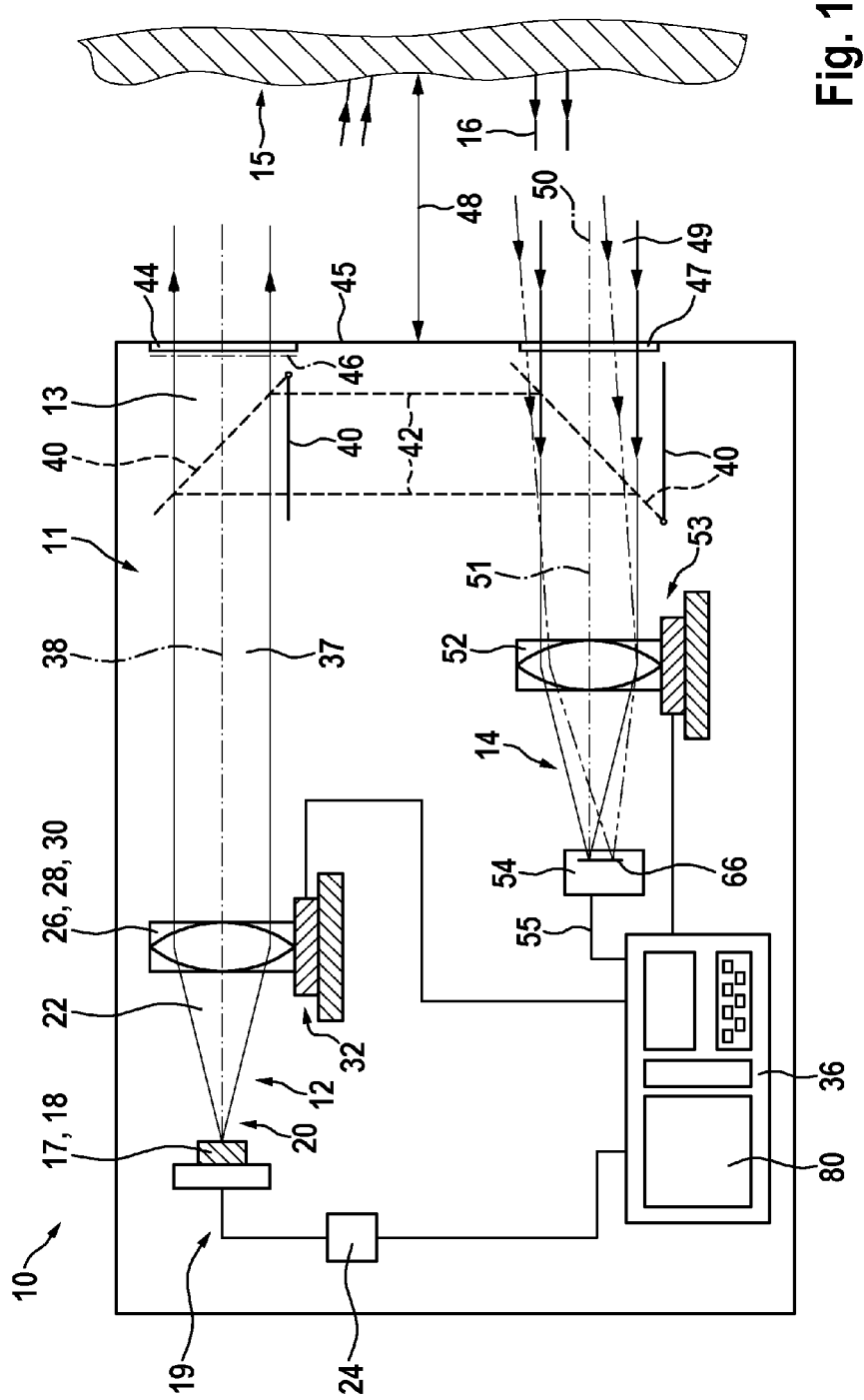
FIG. 1 shows a measuring device for optical distance measurement in accordance with one embodiment of the present disclosure.

FIG. 1 schematically illustrates a measuring device 10 for optical distance measurement according to the disclosure with the most important components for describing its function.

The measuring device 10 comprises a housing 11, in which a transmitting unit 12 for emitting optical measurement radiation 13 and a receiving unit 14 for detecting measurement radiation 16 returning from a target object 15 are arranged.

The transmitting unit 12 comprises a light source, which is realized by a semiconductor laser diode 18 in the exemplary embodiment illustrated. The laser diode 18 emits a laser beam 20 in the form of a light bundle visible to the human eye. For this purpose, the laser diode 18 is operated by means of a control unit 24, which, by means of corresponding electronics, generates a temporal modulation of an electrical input signal 19 of the laser diode 18. What can be achieved by such modulation of the diode current is that the optical measurement radiation 13 utilized for distance measurement is likewise modulated temporally in terms of its intensity in a desired manner.

The control unit 24 and the transmitting unit 12 can be designed to emit unmodulated measurement radiation 13, for example during a calibration process. For this purpose, the control unit 24 can operate the laser diode 18 with a constant diode current. Alternatively, the control unit 24 can turn off the transmitting unit 12 in a targeted manner during the calibration process, such that only substantially unmodulated background radiation impinges on the receiving unit 14.

In particular during a distance measuring process, the laser beam bundle 20 subsequently passes through a collimation optical unit 26 in the form of an objective 28, which is illustrated in the form of an individual lens in a simplified manner in FIG. 1. In this exemplary embodiment, the objective 28 is optionally situated on an adjusting assembly 32, which, in principle, makes it possible to change the position of the objective in all three spatial directions, for example for alignment purposes. Alternatively, however, the collimation optical unit 26 can also already be part of the laser diode 18 or fixedly connected thereto.

After passing through the objective 28, this results in a, for example amplitude-modulated, signal of the measurement radiation 13 in the form of an almost parallel light bundle 37, which propagates along an optical axis 38 of the transmitting unit 12.

In addition, a preferably switchable beam deflector 40 can also be situated in the transmitting unit 12, and allows the measurement radiation 13 to be deflected wholly or partly whilst bypassing the target object 15 directly, that is to say device-internally, onto the receiving unit 14. In this way, it is possible to generate a device-internal reference path 42, which allows calibration or adjustment of the measuring device. The possibility of device-internal light deflection can be used, in particular, during the calibration process with unmodulated measurement radiation.

If a distance measurement is carried out by means of the measuring device 10, the measurement radiation 13 leaves the housing 11 of the measuring device through an optical window 44 in the end wall 45 of the measuring device 10. The opening of the optical window 44 can be protected for example by a shutter 46. For the purpose of actual measurement, the measuring device 10 is then aligned toward a target object 15 whose distance 48 from the measuring device 10 is intended to be determined. The signal 16 reflected or scattered at the desired target object 15 forms returning optical measurement radiation 16 in the form of a returning beam bundle 49 or 50, a certain portion of which passes back into the measuring device 10 again.

Through an entrance window 47 at the end side 45 of the measuring device 10, the returning measurement radiation 16 is coupled into the measuring device 10 and then impinges, as illustrated in FIG. 1, on a receiving optical unit 52.

Two returning measurement beam bundles 49 and 50 for two different target object distances 48 are depicted for illustration by way of example in FIG. 1. For large object distances, where large can be interpreted as large relative to the focal length of the receiving optical unit 52, the optical measurement radiation 16 returning from the target object 15 is incident approximately parallel to the optical axis 51 of the receiving unit 14. This case is represented by the measurement beam bundle 49 in the exemplary embodiment in FIG. 1. As the object distance becomes smaller, the returning measurement radiation 16 incident in the measuring device is inclined more and more relative to the optical axis 51 of the receiving unit 14 on account of a parallax. The beam bundle 50 is depicted in FIG. 1 as an example of such a returning measurement beam bundle in the near range of the measuring device.

The receiving optical unit 52, which is likewise merely symbolized schematically by an individual lens in FIG. 1, focuses the beam bundle of the returning measurement radiation 16 onto the detection area 66 of a receiving detector 54 provided in the receiving unit 14. The detector 54 has a multiplicity of pixels for detecting the optical measurement radiation. Each of the pixels has at least one light-sensitive SPAD. By means of the SPADs provided in the detection area 66, which are arranged individually or in groups in combination in pixels in a matrix-like manner and are connected to an evaluation unit 36, the incident returning measurement radiation 16 is converted into an electrical signal 55 and fed for further evaluation in the evaluation unit 36. In this case, on account of inherent properties of the SPADs, the electrical signal 55 can be regarded as a digital signal that reproduces a counting rate of photons impinging on the respective pixels of the detection area 66.

The detection signals generated by an individual SPAD or a combination of SPADs can be fed to one or more distance determining unit(s) contained in an evaluation unit 36. The distance determining unit can sum the detection signals and generate therefrom a signal corresponding to a time-dependent intensity of the light signal impinging on the respective SPADs or the light intensity. By relating this signal to an excitation signal indicating the temporal profile of the photon rate emitted by the transmitting unit 12, it is possible to deduce a photon time of flight from the transmitting unit 12 toward the target object 15 and back again to the receiving unit 13. If the transmitting unit 12 periodically modulates the emitted light sinusoidally, for example, it is possible to determine a time of flight from a phase difference between the emitted and detected measurement radiation.

In detail, the distance determining unit can forward the digital detection signals received by the receiving unit 14 to different digital counters during different subperiods. The distance determining unit is in some instances also designated herein as "binning architecture" and the subperiods are in some instances designated as "bin widths". In this case, the sum of the subperiods should correspond to the period of the modulated measurement radiation. In other words, during a subperiod, a periodically repeating phase region of the periodically modulated detection signal is detected and the corresponding digital detection signals are accumulated in counters. For this purpose, the detection signals, temporally correlated with the periodicity of the driving signal to the laser diode 18, can be conducted to corresponding digital counters via multiplexers during the different subperiods. From the counting results of the digital counters accumulated over many periods, it is then possible to deduce the phase difference between the emitted and detected measurement radiation and thus to determine the desired distance.

The evaluation unit 36 furthermore has a calibration unit 80. As described in detail hereinafter, the calibration unit is designed to calibrate the measuring device 10, and in particular the evaluation unit 36 thereof, during a calibration process in which the detection unit is illuminated with unmodulated light.

Figure 2:
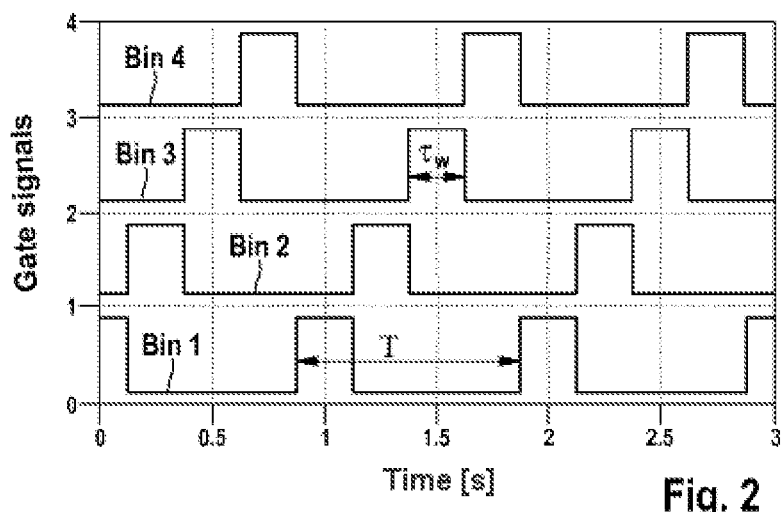
FIG. 2 shows a schematic illustration of digital gate signals of a binning architecture such as can be used in a measuring device according to the disclosure.

FIG. 2 shows a schematic illustration of digital gate signals of a binning architecture on the basis of the example of a four-fold multiplexer. The size and the stability of the bin widths actually realized can constitute a particularly large systematic error source. A deviation of the bin widths from their desired value can have a considerable effect on the measurement result, particularly in the case of strong background illumination.

The bin widths can be calibrated by means of a measurement with non-modulated constant light. In this case, such a calibration measurement against the background of a high required accuracy with a low signal-to-noise ratio can take a very long time, for example longer than the actual distance measurement.

Furthermore, unmodulated light generation can be effected for the calibration measurement by means of the non-modulated operation of the laser diode 18 of the measuring device 10, said laser diode serving as a transmitting unit 12. The intensity of the laser diode 18 can be chosen or even regulated in such a way that the paralyzable detector in the form of an SPAD serving as a receiving unit 14 is operated with a high counting rate.

One advantage of this type of calibration by means of non-modulated laser radiation can reside in the fact that the measurement time required for the calibration can be shortened with the same accuracy.

A further advantage can reside in the fact that the calibration can be carried out completely using system components already present. All that is required is to switch off the laser diode modulation, which can be realized very easily. Consequently, no additional components are required, which can mean a cost saving.

Figure 3:
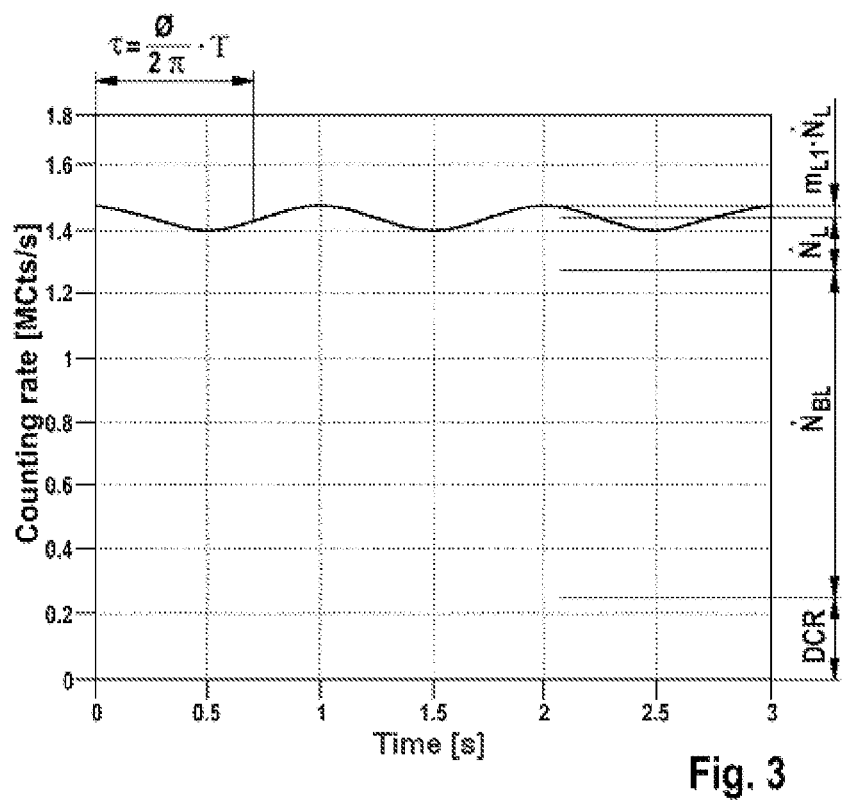
FIG. 3 shows by way of example a temporal dependence of a counting rate of a photon counter used as a receiving unit in the case of illumination with modulated measurement radiation.

One advantage of the disclosure in accordance with one embodiment is described below on the basis of an example with continuously modulated laser radiation, specifically with sinusoidal modulation. With the designations given in FIG. 3, the modulation M on the receiving side is defined by $$M \equiv \frac{m_{L1} \cdot \dot{N}_L}{\dot{N}_L + \dot{N}_{BL} + DCR} \quad (1)$$

In this case, $m_{L1}$ is a factor describing the modulation depth of the laser radiation emitted on the device side, $\dot{N}_L$ is the temporally averaged counting rate (in counts/s) with respect to the detected laser light, $\dot{N}_{DL}$ is the temporally averaged counting rate with respect to background radiation, and DCR is a dark counting rate of the detector.

Under typical measurement conditions, the modulation can assume values in the percent range, for example.

Furthermore, an estimation of the error propagation of the bin width error $\delta\tau_w$ to the phase error $\Delta\phi$ yields the following relationship:

$$\Delta\phi \propto \frac{1}{M} \cdot \frac{\delta\tau_w}{T} \quad (2)$$

where T represents the period of the modulated measurement radiation.

The phase error is antiproportional to the modulation of the signal received under measurement conditions and proportional to the relative accuracy of the bin width relative to the modulation period. The high sensitivity of the system to deviations of the bin widths from the desired value thus become clear: given strong background illumination, a uniform phase accuracy requires a higher accuracy during the bin width calibration.

If the calibration measurement is effected with unmodulated constant light, as proposed, then counter readings which are directly proportional to the effective bin widths arise after a certain measurement time. Consequently, a calibration of the bin widths can be carried out. Assuming that the counter events exhibit Poisson distribution, the following arises for the measurement time required for calibration:

$$t \propto \frac{1}{\Delta\phi^2} \cdot \frac{1}{M^2 \cdot \dot{N}_{DC}} \quad (3)$$

In this case, $\Delta\phi$ is the uncertainty of the phase which is still afforded tolerance with calibration, M is the modulation achievable under the measurement condition, and $\dot{N}_{DC}$ is the counting rate used during the calibration measurement.

If the non-modulated laser radiation is used for the calibration measurement, then by comparison with the measurement without a laser this results in a relative time saving of:

$$\eta \equiv \frac{\text{required calibration measurement time with laser}}{\text{required calibration measurement time without laser}} = \quad (4)$$

$$\frac{\dot{N}_{BL} + DCR}{\dot{N}_L + \dot{N}_{BL} + DCR}$$

The time saving is all the greater, the smaller the background illumination proportion.

The invention claimed is:

1. A measuring device for optical distance measurement, in particular a handheld measuring device, comprising:
    a transmitting unit for emitting periodically modulated optical measurement radiation toward a target object;
    a receiving unit for detecting optical measurement radiation returning from the target object;
    an evaluation unit for receiving and evaluating detection signals of the receiving unit; and
    a calibration unit for calibrating the measuring device,
    wherein the calibration unit is designed to calibrate the evaluation unit on the basis of a detection of uncorrelated radiation which does not correlate with the modulated measurement radiation emitted by the transmitting unit,
    wherein a period of the periodically modulated measurement radiation is subdivided into a plurality of subperiods,
    wherein the evaluation unit is designed to cumulate a detection signal received by the receiving unit over predetermined subperiods, and
    wherein the calibration unit is designed to calibrate a length of the subperiods on the basis of a detection of unmodulated radiation.

2. The measuring device as claimed in claim 1 wherein the calibration unit is designed to calibrate the evaluation unit on the basis of a detection of unmodulated radiation.

3. The measuring device as claimed in claim 1, wherein the calibration unit is designed to calibrate the evaluation unit on the basis of a detection of background radiation.

4. The measuring device as claimed in claim 1, wherein the measuring device is designed to the effect that uncorrelated radiation impinges on the receiving unit with an intensity adapted to a detection sensitivity of the receiving unit.

5. The measuring device as claimed in claim 4, wherein:
the receiving unit has a paralyzable radiation detector, and
the unmodulated radiation is guided onto the receiving unit with an intensity adapted to a maximum of a detector signal, in particular a maximum detection event rate of the paralyzable radiation detector.

6. The measuring device as claimed in claim 1, wherein the receiving unit has at least one SPAD.

7. The measuring device as claimed in claim 1, wherein the measuring device is designed to determine a duration of a calibration process to be performed by the calibration unit on the basis of a predefined calibration accuracy and an intensity of the unmodulated radiation detected by the receiving unit.

8. A measuring device for optical distance measurement, in particular a handheld measuring device, comprising:
   a transmitting unit for emitting periodically modulated optical measurement radiation toward a target object;
   a receiving unit for detecting optical measurement radiation returning from the target object;
   an evaluation unit for receiving and evaluating detection signals of the receiving unit; and
   a calibration unit for calibrating the measuring device,
   wherein the calibration unit is designed to calibrate the evaluation unit on the basis of a detection of uncorrelated radiation which does not correlate with the modulated measurement radiation emitted by the transmitting unit,
   wherein the calibration unit is furthermore designed for emitting uncorrelated measurement radiation, and
   wherein the calibration unit is designed to calibrate the evaluation unit on the basis of a detection of uncorrelated measurement radiation.

9. The measuring device as claimed in claim 8, wherein the measuring device is designed to guide measurement radiation, in particular uncorrelated measurement radiation, within the measuring device onto the receiving unit.

10. The measuring device as claimed in claim 8, wherein:
   a period of the periodically modulated measurement radiation is subdivided into a plurality of subperiods;
   the evaluation unit is designed to cumulate a detection signal received by the receiving unit over predetermined subperiods; and
   the calibration unit is designed to calibrate a length of the subperiods on the basis of a detection of unmodulated radiation.

11. The measuring device as claimed in claim 8, wherein the measuring device is designed to the effect that uncorrelated radiation impinges on the receiving unit with an intensity adapted to a detection sensitivity of the receiving unit.

12. The measuring device as claimed in claim 11, wherein:
   the receiving unit has a paralyzable radiation detector, and
   the unmodulated radiation is guided onto the receiving unit with an intensity adapted to a maximum detection event rate of the paralyzable radiation detector.

13. The measuring device as claimed in claim 8, wherein the receiving unit has at least one SPAD.

14. The measuring device as claimed in claim 8, wherein the measuring device is designed to determine a duration of a calibration process to be performed by the calibration unit on the basis of a predefined calibration accuracy and an intensity of the unmodulated radiation detected by the receiving unit.

* * * * *